United States Patent [19]

Gunn

[11] Patent Number: 4,821,165
[45] Date of Patent: Apr. 11, 1989

[54] HIGH VOLTAGE DC POWER SUPPLY

[75] Inventor: Bradley R. Gunn, Sunnyvale, Calif.

[73] Assignee: Varian Associates, Inc., Palo Alto, Calif.

[21] Appl. No.: 62,806

[22] Filed: Jun. 15, 1987

[51] Int. Cl.$^4$ .............................................. H02M 3/18
[52] U.S. Cl. ..................................... 363/60; 363/124; 328/262
[58] Field of Search ..................... 363/59, 60, 61, 124; 328/262

[56] References Cited

U.S. PATENT DOCUMENTS

| | | | |
|---|---|---|---|
| 3,553,459 | 1/1971 | Siedband et al. | 363/59 X |
| 4,034,280 | 7/1977 | Cronin et al. | 363/124 X |
| 4,092,712 | 5/1978 | Harrigill, Jr. et al. | 363/60 |
| 4,217,633 | 8/1980 | Evans, Jr. | 363/60 X |
| 4,691,271 | 9/1987 | Rosenbaum et al. | 363/60 |

FOREIGN PATENT DOCUMENTS 2080639  1/1982  United Kingdom .................. 363/60

OTHER PUBLICATIONS

VMI Voltage Multipliers, Inc., 8 page brochure.
TK 7868 P6 H46, p. 84.
TK 7868 P8 1328, pp. 8 and apparently 9.
TK 7872 R35 S34, p. 192.
TK 3111 A3, (3 unknown pages).
TK 3401-K83, (3 unknown pages).

Primary Examiner—Patrick R. Salce
Assistant Examiner—Marc S. Hoff
Attorney, Agent, or Firm—Stanley Z. Cole; Gerald M. Fisher; Peter J. Sgarbossa

[57] ABSTRACT

A DC power supply for a traveling wave tube having cathode, collector and helix electrodes responds to a DC power source and a high frequency switching source. A switch controlled by the switching source is opened and closed at a fixed frequency and variable duty cycle determined by the helix-cathode voltage. A flyback choke is connected to the switch and DC power supply so current flows between the power source via the choke to the switch and a series resonant circuit while the switch is closed. First and second capacitors in separate branch circuits of the resonant circuit are respectively connected to first and second AC to DC converter and voltage multiplier stacks; each multiplier in the stacks includes a pair of branches with oppositely poled plural signal switching diodes and a capacitor. The cathode and helix are respectively connected to output terminals of the first and second stacks, while the collector is connected to a terminal between the first and second stacks. The resonant circuit is connected with the switch, flyback choke and voltage multipliers so that while the switch is closed a half-wave rectified current waveform at the resonant circuit resonant frequency flows in the resonant circuit and a ramping current having a first polarity direction flows in the choke. A ramping current having a second plurality direction flows in the choke and resonant circuit while the switch is open.

31 Claims, 2 Drawing Sheets

HIGH VOLTAGE DC POWER SUPPLY

FIELD OF INVENTION

The present invention relates generally to high voltage DC power supplies and more particularly to a high voltage DC power supply including a switch connected in series with a flyback choke across a DC power supply and resonant circuit means connected to an AC to DC converter preferably including stacked voltage multiplier modules. In accordance with another aspect of the invention, a high voltage DC power supply responsive to an AC current source includes plural stacked voltage multiplier modules capacitively coupled to a common terminal of the AC current source so current flows in opposite directions to different ones of the modules.

BACKGROUND ART

In the commonly assigned, copending application entitled High Voltage Power Supply Particularly Adapted for a TWT, Ser. No. 909,439, filed Sept. 19, 1986, of which I am a coinventor, there is disclosed a relatively soft high voltage power supply for cathode, collector and helix electrodes of a traveling wave tube (TWT). The prior art circuit includes a low voltage transformer and four switching field effect transistors (FET's) arranged in a bridge network. Current from the bridge network flows via a series resonant circuit to plural, stacked voltage multiplier circuits. Each of the voltage multiplier circuits is transformer coupled to the resonant circuit via a separate toroidal core transformer.

Each of the voltage multiplier circuits includes plural, inexpensive, high speed switching signal diodes, typically having a recovery time of 3-4 nanoseconds so they are capable of responding to and rectifying relatively high frequency currents, i.e., frequencies greater than 300 KHz. The fast recovery time of the switching diodes is a very small fraction of a half cycle of the resonant frequency currents.

The prior art circuit is particularly well suited to power traveling wave tubes having cathode to collector voltages in the 10 KV range and power requirements in the 2 kilowatt range. Many traveling wave tubes have significantly lower voltage and power requirements. The power supply requirements of such tubes are advantageously satisfied with structures having lower space, volume, cost and component count requirements. In particular, it would be advantageous to eliminate the need for the low voltage power transformer and all but one of the switches of the FET bridge circuit. It would also be advantageous to eliminate any type of magnetic coupling transformer.

It is, accordingly, an object of the present invention to provide a new and improved relatively inexpensive DC power supply particularly adapted for traveling wave tubes having relatively low voltage and power requirements.

Another object of the invention is to provide a new and improved relatively inexpensive high voltage DC power supply particularly adapted for the cathode, helix and collector electrodes of a traveling wave tube, which power supply has low volume, weight and component count requirements.

A further object of the invention is to provide a new and improved relatively inexpensive high voltage DC power supply responsive to a low voltage DC source that is chopped by a single transistor switch for supplying resonant current to an AC to DC converter via capacitive coupling circuits, to eliminate the need for a low voltage transformer.

A further object of the invention is to provide a new and improved high voltage DC power supply employing stacked voltage multiplier circuits having inexpensive switching diodes responsive to relatively high frequency currents derived from a resonant circuit.

THE INVENTION

In accordance with one aspect of the present invention, an AC to DC converter responsive to a relatively low voltage DC power supply source comprises a high frequency switching source for deriving pulses having variable durations, in combination with rectifier means for deriving a DC output voltage, a switch controlled by the switching source to open and closed states, a flyback choke connected in series with the switch and the DC power source so current flows between terminals of the power source via the choke and switch while the switch is closed and resonant circuit means connected in circuit with the switch, the flyback choke and the rectifier means. Each time the switch is closed (a) a half wave rectified current waveform or hump at the resonant frequency of the resonant circuit flows in the resonant circuit means and (b) a ramping current having a first polarity direction flows in the choke. While the switch is open a ramping current having a second polarity direction flows in the choke and the resonant circuit. The rectifier means responds to each half wave rectified current hump to derive the DC output. In response to the amplitude of the DC output the durations of the pulses are controlled to maintain the DC output with a substantially constant voltage. The amount of energy stored in the choke each time the switch is closed is determined by the duration of the pulses and the amplitude of each sinusoidal hump is determined by the amount of energy stored in the choke. Thus, the variable duration pulses having widths controlled by the converter DC output voltage level control the amplitudes of the half wave sinusoidal resonant current humps that are converted to the DC output voltage by the rectifier means.

In accordance with an additional aspect of the present invention, a high voltage DC power supply responsive to a relatively low voltage DC power supply source and a high frequency switching source comprises capacitive and diode AC to DC converter and voltage multiplier means for deriving the high voltage DC, in combination with (a) a switch controlled by the switching source to open and closed states, (b) a flyback choke connected in series with the switch and the DC power source, and (c) resonant circuit means. The flyback choke, switch and DC power source are connected so current flows between terminals of the power source via the choke and switch while the switch is closed. The resonant circuit means is connected in circuit with the switch, the flyback choke and the voltage multiplier means so that while the switch is closed (a) a half wave rectified current hump at the resonant frequency of the resonant circuit means flows in the resonant circuit means and (b) a ramping current having a first polarity direction flows in the choke; while the switch is open a ramping current having a second polarity direction flows in the choke and the resonant circuit means. The AC to DC converter and voltage multiplier means responds to the half wave current humps to derive the high voltage DC.

The stated circuit arrangement is advantageous because it employs a single switch, rather than a bridge including four switches. In addition, capacitors in the resonant circuit means capacitively couple the voltage multiplier means to the resonant circuit. The power supply of the present invention obviates the need for a high voltage power transformer or any magnetic coupling component coupling the resonant frequency current to the voltage multipliers of the prior art. The power supply is advantageously employed for traveling wave tubes having 300 watt power requirements at cathode-helix voltages of approximately 4 KV, and collector-helix voltages in the 1.5 to 2 KV range.

In accordance with another aspect of the invention the AC to DC converter and voltage multiplier means includes plural stacked voltage multiplier modules, each including a pair of oppositely poled diode means and a capacitor connected between oppositely poled electrodes of the pair of diode means. Preferably, the diode means comprises a series string of inexpensive switching diodes capable of handling high frequency resonant currents, as disclosed in the aforementioned, copending application. Different ones of the stacked modules are capacitively coupled to a common terminal of the resonant circuit means so that current flows in opposite directions to the plural stacked modules. In other words, current is supplied to an intermediate voltage tap of the stacked modules so that current flows in a first direction to a stacked module having a relatively high voltage and current flows in a second direction to a stacked module having lower voltage. This circuit arrangement reduces the current requirements of capacitors of the lower voltage stacked modules so smaller sized capacitors than would otherwise be the case can be used. To provide a return path for the resonant current, high voltage output terminals of the stacked modules are connected by capacitive means to a grounded electrode of the low voltage power supply while the switch is closed and back to the choke while the switch is open.

In accordance with a further aspect of the invention, a high voltage DC power supply for cathode, collector and helix electrodes of a traveling wave tube is responsive to a relatively low voltage DC power source and a high frequency switching source. Such a high voltage power supply comprises a switch controlled by the switching source to open and closed states, a flyback choke connected in series with the switch and the DC source so current flows between terminals of the power source via the choke and switch while the switch is closed, and an inductor and a pair of capacitors connected to first and second voltage multiplier stacks. The inductor has a first terminal connected between the choke and switch and a second terminal connected to first electrodes of the capacitors; the capacitors are connected in separate branch circuits and have second electrodes respectively connected to the first and second voltage multiplier stacks. Each voltage multiplier in both of the stacks includes a pair of oppositely poled diode means and a capacitor connected between oppositely poled electrodes of the pair of diode means. The first and second stacks are stacked together. The cathode and helix are connected to opposite polarity terminals of the first and second stacks, while the collector is connected to a terminal between the first and second stacks.

In a preferred embodiment, the second electrode of the second capacitor is connected to a terminal of the second stack at a voltage slightly displaced from the helix voltage and considerably displaced from the collector voltage. The second electrode of the first capacitor is preferably connected to a terminal of the first stack at a voltage somewhat displaced from the cathode voltage and considerably displaced from the collector voltage. The first stack includes third and fourth capacitors connected to the first capacitor so that AC current flowing in the first capacitor flows in opposite directions through the third and fourth capacitors to voltage multipliers on different sides of the first stack relative to the connection of the electrode of the first capacitor to the first stack.

The above and still further objects, features and advantages of the present invention will become apparent upon consideration of the following detailed description of a specific embodiment thereof, especially with the accompanying drawing.

BEST MODE FOR CARRYING OUT THE INVENTION

Figure 1:
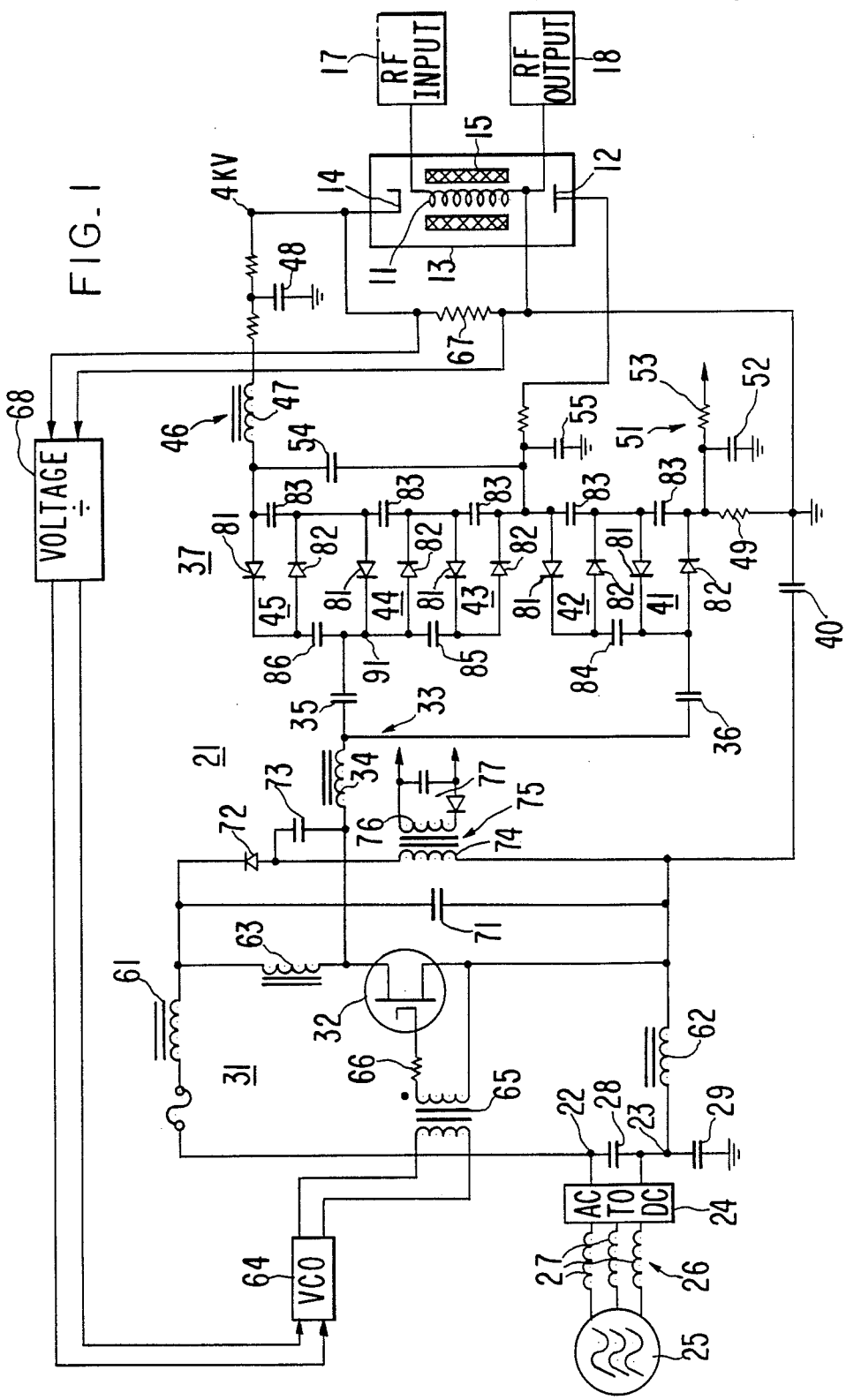
Figure 1 is a circuit diagram of a preferred embodiment of the invention.

Reference is now made to FIG. 1 of the drawing wherein the present invention is illustrated in connection with a power supply for helix electrode 11, collector electrode 12 and cathode 14 of traveling wave tube 13 including magnetic coil 15. Helix 11 includes RF input and output electrodes respectively connected to RF input 17 and RF output 18. The stated elements within traveling wave tube 13 and the connections thereto are conventional. Thereby, no further description of traveling wave tube 13 and the elements associated therewith is necessary.

Helix 11 and collector 12 are typically operated at relatively high DC voltages in excess of 1 KV relative to cathode 14 and have different current demands. In one tube type, cathode 14 is at −4 KV, collector 12 is at −1.7 KV and helix 11 is grounded. The traveling wave tube electrodes have power requirements of approximately 300 to 400 watts which are satisfied by the power supply of the present invention. While different tube types have different voltage and current requirements for electrodes 11 and 12, power supply 21 of the present invention is generally capable of supplying a maximum power of about 400 watts.

Power supply 21 for traveling wave tube 13, is responsive to a relatively low level DC power supply voltage, on the order of 300 volts, as derived between terminals 22 and 23 at the output of AC to DC converter 24. Converter 24 is responsive to any suitable AC source, such as three phase AC source 25 coupled to converter 24 via three phase line 26, containing noise suppression series inductors 27. The 300 volt DC output of converter 24 is developed across power supply capacitor 28 such that terminal 22 has a positive polarity relative to terminal 23, connected to ground via noise reducing capacitor 29. Capacitor 40, connected between ground and terminal 23 of DC power supply 24 via series noise decoupling inductor 62, provides DC isolation between three phase supply 25 and electrodes 11, 12 and 14 of the TWT and AC coupling of current in resonant circuit 33 while switch 32 is on.

Power supply 21 converts the DC voltage between terminals 22 and 23 to a high frequency waveform (between 300 and 500 KHz) which is converted into high DC voltages by AC to DC converter and voltage multiplier 37, including capacitors and diodes. The DC to high frequency conversion is provided by network 31, including single field effect transistor (FET) switch 32 and series resonant circuit 33 containing inductor 34 and capacitors 35 and 36, connected in two separate branches to the inductor. The values of capacitor 35 and 36 ($C_{35}$ and $C_{36}$ respectively) are selected to equal the ratio of the current capacity requirements of cathode 14 and collector 12 ($I_{CATHODE}$ and $I_{COLLECTOR}$ respectively); thus, $$\frac{C_{35}}{C_{36}} = \frac{I_{CATHODE}}{I_{COLLECTOR}}$$

AC to DC converter and voltage multiplier 37 includes stacked voltage multiplier modules 41-45. Cathode 14, at −4 KV, is connected to the high voltage terminal of module 45 by filter circuit 46 including series inductor 47 and shunt capacitor 48; collector 12, at −1.7 KV, is connected to a terminal between modules 42 and 43; helix 11 is connected to the low voltage terminal of module 41 via resistor 49, across which is developed a relatively low voltage, such as one or two volts. The voltage developed across resistor 49, indicative of the current flowing in helix 11, is supplied to a suitable voltage monitoring device via low pass filter 51 including shunt capacitor 52 and coupling resistor 53.

Capacitors 54 and 55 provide return paths for AC currents supplied to the high voltage output of voltage multiplier 45 and at the terminal between multipliers 42 and 43. Capacitor 54 is connected between the high voltage output terminal of multiplier 45 and the terminal between multipliers 42 and 43, while capacitor 55 is connected between ground and the terminal between multipliers 42 and 43.

The switching circuit including field effect transistor 32 is connected to terminals 22 and 23 by series, noise reducing inductances 61 and 62 that decouple the high frequency resonant currents of circuit 33 from converter 24 and AC supply 25. FET 32 includes a source drain path in series with flyback choke 63; the combination of the flyback choke and source drain path is connected to be responsive to the voltage developed between inductors 61 and 62.

FET switch 32 is activated to the open and closed states by a fixed frequency, variable duty cycle square wave output of voltage controlled oscillator 64, coupled to the gate source electrodes of the FET via signal transformer 65 and current limiting resistor 66. The duty cycle of the square wave derived by oscillator 64 is controlled by the voltage between helix 11 and cathode 14, as derived across resistor 67 and supplied to the oscillator via voltage divider 68. As the voltage across helix 11 and cathode 12 varies, the duty cycle of the output of oscillator 64 is changed, to maintain the cathode-helix voltage constant. For certain situations, the duty cycle of oscillator 64 cannot exceed 50%.

Shunting the series combination of the source drain path of FET switch 32 and flyback choke 63 are two shunt branches, respectively including AC coupling capacitor 71 and a clamp circuit for the source drain path of FET 32. The clamp contains diode 72 and capacitor 73 and is connected to primary winding 74 of low power, step down transformer 75. Transformer 75 includes secondary winding 76 for driving low power AC to DC converter 77 provided for loads, such as transistor circuitry, in the same general environment as TWT 13. This arrangement obviates the need for a separate low power supply for such loads.

The clamp circuit including diode 72 and capacitor 73 is arranged so that opposite electrodes of the capacitor are respectively connected to the drain of FET 32 and to a common terminal between the anode of diode 72 and one end of primary winding 74. The cathode of diode 72 is connected to a common terminal between filter inductor 61 and flyback choke 63. As such, the clamp circuit clamps the source drain of voltage of FET 32 to prevent breakdown of the FET while it is in a back biased, i.e., open condition. If the clamp circuit is employed, the maximum duty cycle of FET switch 32 is 50%.

Figure 2A:
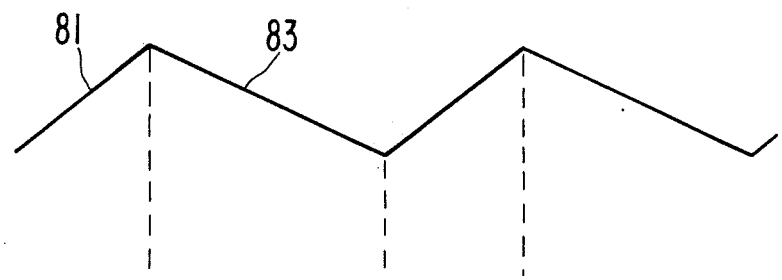
FIGS. 2a and 2b are waveforms useful in helping describe the operation of the circuit of FIG. 1.

Typically, FET switch 32 is switched on and off at a fixed frequency in the range of 300–500 KHz by the signal coupled to the gate of the FET. While FET 32 is activated to an on, forward biased condition, current flows from DC power supply terminal 22 through inductor 63 and the FET source drain path. The current flowing through flyback choke 63 while FET 32 is switched on has a positive going ramping waveform, as indicated by waveform segment 81, FIG. 2A. In response to current waveform segment 81 flowing through choke 63, the choke stores energy. While the source drain path of FET 32 is forward biased, one half cycle of a sine wave having a frequency equal to the resonant frequency of inductor 34 in series with the parallel combination of capacitors 35 and 36 flows from the resonant circuit through the FET source drain path. The resonant current flowing through the FET source drain path flows back to capacitors 35 and 36 via the return path established by capacitors 40, 54 and 55 through voltage multipliers 41-45. When one half cycle of the resonant circuit sine wave has been completed the resonant current stops flowing because the diodes in voltage multipliers 41-45 become back biased.

Figure 2B:
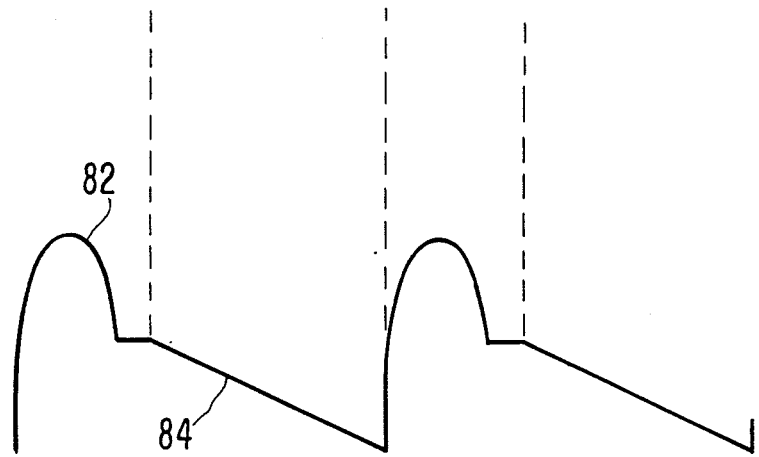

Hence, while the source drain path of FET 32 is forward biased one half cycle (or for some very light load conditions, less than one half cycle) of a sinusoidal current hump 82, FIG. 2b, flows through resonant circuit 33. The amplitude of the half cycle sinusoidal current hump flowing in resonant circuit 33 is determined by the duty cycle of output pulses of voltage controlled oscillator 64, in turn responsive to the voltage between helix 11 and cathode 14. When the helix-cathode voltage is less than a desired set point value, the duty cycle increases resulting in a greater amplitude for the half cycle current hump 82 flowing in resonant circuit 33; conversely, in response to the helix-cathode voltage being greater than the set point value, the amplitude of the current hump decreases in response to the lower duty cycle for the on time of FET switch 32.

The amplitude of the current hump in circuit 33 is determined by the length of the on duty cycle of switch 32 because the amount of energy stored in flyback choke 63 is controlled by the length of time current flows between terminals 22 and 23 through the choke. As the on time of switch 32 increases there is an increase in the energy stored in choke 63 from converter 24, particularly after the resonant current hump has ended. The increased energy stored in choke 63 increases the amplitude of the AC current flowing in circuit 33 the next time switch 32 is closed since the choke functions as a current source. Conversely, as the on time duty cycle of switch 32 decreases, less energy is stored in choke 63, causing the resonant circuit current amplitude to decrease. The resonant current flowing in resonant circuit 33 is coupled to AC to DC converters and voltage multipliers 41-45 to develop the DC voltages which are supplied to collector 12 and cathode 14 relative to helix 11.

During the interval while FET switch 32 is in an open, back biased (off) condition, a negative going ramping current, indicated by waveform segment 83 (FIG. 2a), flows in flyback choke 63, to discharge the energy stored in the choke during the interval while waveform segment 81 occurs. While negative going current ramp segment 83 flows in flyback choke 63, the source drain path voltage of FET 32 is clamped by the connection of the flyback choke to capacitor 73 and diode 72. Diode 72 limits the source drain voltage across FET 32 during the time while the FET is cut off. While FET 32 is cut off, the negative going current ramp of choke 63 flows into resonant circuit 33 (see waveform segment 84, FIG. 2b) through stacked modules 41-45 and back to the choke via series connected capacitors 54, 55, 40 and 71. As the off time durations of switch 32 decrease and increase the amount of energy stored in choke 63 respectively increases and decreases to control the amplitude of the resonant current sinusoidal humps flowing in circuit 33.

Consideration is now given to stacked modules 41-45 and the circuitry associated therewith. Each of modules 41-45 includes two oppositely poled high speed unidirectional conducting branches, represented in FIG. 1 by oppositely poled diodes 81 and 82. In the preferred embodiment, each of branches 81 and 82 includes 8 or 9 series connected, inexpensive high speed signal switching diodes, e.g., of type IN4148. Each of the diodes in each of the branches 81 and 82 has a recovery time of 3-4 nanoseconds, a very small fraction of a cycle of the resonant current of resonant circuit 33. By connecting 8 or 9 diodes in series with each other, a forward voltage drop of 12.8 or 14.4 volts subsists across each branch and a substantial back bias can exist across each branch.

To provide the desired specification for the voltages of electrodes 11, 12 and 14 eight diodes need be in each of branches 81 and 82. However, an additional diode is preferably connected in each branch as a safety measure. If one of the diodes in branches 81 or 82 malfunctions due to a short circuit, the correct voltage still subsists across the branch. If the malfunction occurs because a diode open circuits, the open circuited diode fuses and becomes a short circuit during the next half cycle because all of the voltage of the multiplier is established across the open circuited diode; the fused diode thus becomes a short circuit.

Each of modules 41-45, in addition to including branches 81 and 82, includes an output capacitor 83, having opposite electrodes connected to the anode of the "last" diode in branch 81 and to the cathode of the "last" diode of branch 82. (The word "last" refers to the diode in branches 81 and 82 in the series chain at the potential most removed from the common terminal of inductor 34 and capacitors 35 and 36.) In response to the high frequency AC current flowing in resonant circuit 33, each of capacitors 83 is charged so that positive and negative voltages are established at the electrodes of capacitor 83 that are respectively connected to branches 81 and 82.

Because of the stacked, series connections of modules 41-45, the output voltages of the modules relative to ground progressively increase relative to ground. In conventional, stacked voltage multiplier modules the current in the lowest voltage modules is quite high and frequently excessive because the charging current for the highest voltage modules must flow through the lowest voltage modules. The circuit of the present invention reduces the high currents in the lowest voltage module by employing two separate current supplying branches including capacitors 35 and 36, and by coupling the current to modules 43-45 from capacitor 35 in opposite directions.

To provide the necessary voltage multiplication for module 42, capacitor 84 is connected between stacked modules 41 and 42. The positive electrode of capacitor 84 is connected to a common terminal for branches 81 and 82 of module 41 and one electrode of capacitor 36, while the remaining electrode of capacitor 84 is connected to a common terminal of branches 81 and 82 in module 42. The high voltage ends of branches 81 and 82 in modules 4 and 42 (at the right side of the branches as illustrated in FIG. 1) are connected together to establish the stacked, series relationship between modules 41 and 42. Similarly, the high voltage ends of branches 81 and 82 in modules 42 and 43 are connected together to provide the stacked, series relationship for modules 42 and 43.

To reduce the current requirements for lower voltage modules 41-43, the current flowing through capacitor 35 is coupled directly to the low voltage ends (at the left sides of branches 81 and 82) of modules 43-45. The current flowing through the capacitor 35 is coupled directly to branches 81 and 82 of module 44 via a common connection of one electrode of capacitor 35 to common terminal 91 at the low voltage ends of branches 81 and 82 of module 44.

The resonant current flowing in capacitor 35 is coupled to modules 43 and 45 via capacitors 85 and 86, respectively. Each of capacitors 85 and 86 includes an electrode that is connected to the common terminal of capacitor 35 and the low voltage sides of branches 81 and 82 of module 44. The remaining electrode of capacitor 85 is connected to the low voltage sides of branches 81 and 82 of module 43, while the remaining electrode of capacitor 86 is connected to a common terminal for the low voltage sides of branches 81 and 82 of module 45.

The stacked, series relationship of modules 43-45 is established by connecting the high voltage ends of branches 81 and 82 of modules 43 and 44, respectively, to each other and by connecting the high voltage ends of branches 81 and 82 of modules 44 and 45, respectively, to each other. By separately supplying current to stacked modules 41 and 42 via capacitor 36 and to modules 43-45 via capacitor 35 and by dividing the current flowing through capacitor 35 so it flows in opposite directions through capacitors 85 and 86, relatively low acceptable current levels flow in all of the modules. With a traveling wave tube power supply the stated arrangement is particularly important because cathode electrode 14 draws considerably more current than helix electrode 11. In other words, the high voltage electrode 14 of the load has greater power requirements than the low voltage electrode 11. The illustrated and described circuit enables the power requirements to be met and obviates the need for large capacitors in terms of capacitance value and physical size.

Because of the capacitive coupling and the use of the series resonant circuit, the power supply of the present invention is very stiff and tends to maintain the voltages for electrodes 11, 12 and 14 at the desired level without a great deal of regulation. Resonant circuit 33 and the connections of it to modules 41–45 enable a single switch to be employed, while providing full wave rectification in each of the modules. Full wave rectification occurs in modules 41–45 because of the high frequency Fourier components associated with the current waveform of resonant circuit 33. The high order, Fourier components are easily handled by the high frequency, signal switching diodes in branches 81 and 82 of modules 41–45. Hence, bi-polarity, high frequency sine wave currents are supplied to the diodes in modules 41–45 even though a single field effect transistor switch is provided.

While there has been described and illustrated a specific embodiment of the invention, it will be clear that variations in the details of the embodiment specifically illustrated and described may be made without departing from the true spirit and scope of the invention as defined in the appended claims.

I claim:

1. A DC power supply responsive to a relatively low voltage DC power source and a high frequency switching source comprising capacitive and diode AC to DC converter means for deriving a DC output voltage, a switch controlled by the switching source to open and closed states, a flyback choke connected in series with the switch and the DC power source so current flows between terminals of the power source via the choke and switch while the switch is closed, resonant circuit means connected in circuit with the switch, the flyback choke and the AC to DC converter means so that each time the switch is closed (a) a half wave rectified current waveform at the resonant frequency of the resonant circuit flows in the resonant circuit means and (b) a ramping current having a first polarity direction flows in the choke, and while the switch is open a ramping current having a second polarity direction flows in the choke and the resonant circuit, the AC to DC converter means responding to each half wave rectified current waveform to derive the DC output voltage.

2. The DC power supply of claim 1 wherein the AC to DC converter means includes voltage multiplier means for deriving the DC output voltage as a high voltage DC.

3. The DC power supply of claim 2 wherein the voltage multiplier means includes plural stacked voltage multiplier modules, each including a pair of oppositely poled unidirectional branches and a capacitor connected between oppositely poled electrodes of the pair of branches, and means for capacitively coupling current to first and second of the stacked modules from a common terminal of the resonant circuit means so that at any instant of time current flows from the common terminal through a first branch including a first capacitor to a first module and through a second branch including a second capacitor to a second module, the coupling being such that the current flowing through the first branch to the first module does not flow through the second module and the current flowing through the second branch to the second module does not flow through the first module.

4. The DC power supply of claim 3 further including capacitive means connected to a high voltage output terminal of the stacked modules for providing a return path for the current of the resonant circuit means flowing in the stacked modules.

5. The DC power supply of claim 4 wherein the capacitive means includes means for establishing a capacitive path for the half wave rectified current waveforms between the high voltage output terminal and a low voltage terminal of the power supply source.

6. The DC power supply of claim 5 wherein the voltage multiplier means includes plural high speed signal switching diodes each having a recovery time that is a small fraction of the duration of each current waveform.

7. The DC power supply of claim 5 wherein the capacitive means includes means for establishing a capacitive path for the half wave rectified current waveforms between the high voltage output terminal and a low voltage terminal of the power source.

8. The DC power supply of claim 7 wherein the voltage multiplier means includes plural high speed signal switching diodes each having a recovery time that is a small fraction of the duration of each half wave rectified current waveform.

9. The DC power supply of claim 4 wherein the capacitive means includes means for establishing a capacitive path for the ramping current having the second polarity direction between the high voltage output terminal and a first terminal of the choke so that the second polarity ramping current flows between a second terminal and the first terminal of the choke via the resonant circuit means, the voltage multiplier means and the capacitive means.

10. The DC power supply of claim 9 wherein the AC to DC converter and voltage multiplier means includes plural high speed signal switching diodes each having a recovery time that is a small fraction of the duration of each half wave rectified current waveform.

11. The DC power supply of claim 7 wherein the AC to DC converter and voltage multiplier means includes plural high speed signal switching diodes each having a recovery time that is a small fraction of the duration of each half wave current waveform.

12. The DC power supply of claim 2 further including capacitive means connected to a high voltage output terminal of the stacked modules for providing a return path for the current of the resonant circuit means flowing in the tacked modules.

13. The DC power supply of claim 3 wherein the capacitive means includes means for establishing a capacitive path for the half wave rectified current waveforms between the high voltage output terminal and a low voltage terminal of the power supply source.

14. The DC power supply of claim 13 wherein the capacitive means includes means for establishing a capacitive path for the half wave rectified current waveforms between the high voltage output terminal and a low voltage terminal of the power supply source.

15. The high voltage DC power supply of claim 12 wherein the capacitive means includes means for establishing a capacitive path for the ramping current having the second polarity direction between the high voltage output terminal and a first terminal of the choke so that the second polarity ramping current flows between a second terminal and the first terminal of the choke via the resonant circuit means, the voltage multiplier means and the capacitive means.

16. The high voltage DC power supply of claim 2 wherein the voltage multiplier means includes plural high speed signal switching diodes each having a recovery time that is a small fraction of the duration of each half wave rectified current waveform.

17. A high voltage DC power supply for cathode, collector and helix electrodes of a travelling wave tube responsive to a relatively lo voltage DC power source and a high frequency switching source comprising a switch controlled by the switching source to open and closed states, a flyback choke connected in series with the switch and the DC power source so current flows between terminals of the power source via the choke and switch while the switch is closed, an inductor having a first terminal connected between the choke and switch and a second terminal connected to first electrodes of first an second capacitors connected in separate branch circuits, the first and second capacitors having second electrodes respectively connected to first and second AC to DC converter and voltage multiplier stacks, each AC to DC converter and voltage multiplier in said stacks including a pair of oppositely poled unidirectional branches and a capacitor connected between oppositely poled electrodes of the pair of branches, the first and second stacks being stacked together, opposite polarity terminals of the first and second stacks being adapted to be connected to the cathode and helix, respectively, a terminal between the first and second stacks being adapted to be connected to the collector.

18. The high voltage DC power supply of claim 17 wherein the second electrode of the second capacitor is connected to a terminal of the second stack at a DC voltage slightly displaced from the helix voltage and considerably displaced from the collector voltage.

19. The high voltage DC power supply of claim 18 wherein the first capacitor is connected to a terminal of the first stack at a DC voltage somewhat displaced from the cathode voltage and considerably displaced from the collector voltage.

20. The high voltage DC power supply of claim 19 wherein the first stack includes third and fourth capacitors connected to the first capacitor so that AC current flowing in the first capacitor flows through the third and fourth capacitors to AC to DC converters and voltage multipliers on different sides of the first stack relative to the connection of the electrode of the first capacitor to the first stack.

21. The high voltage DC power supply of claim 20 further including capacitor means connected to the first and second stacks for providing return current paths from the first and second stacks for the currents flowing in the first and second capacitors.

22. A DC to DC converter responsive to a relatively low voltage DC power source and a high frequency switching source comprising rectifier means for deriving a DC output voltage, a switch controlled by the switching source to open and closed states, a flyback choke connected in series with the switch and the DC power source so current flows between terminals of the power source via the choke and switch while the switch is closed, resonant circuit means connected in circuit with the switch, the flyback choke and the rectifier means so that each time the switch is closed (a) a half wave rectified current waveform at the resonant frequency of the resonant circuit flows in the resonant circuit means and (b) a ramping current having a first polarity direction flows in the choke, and while the switch is closed a ramping current having a second polarity direction flows in the choke and the resonant circuit, the rectifier means responding to each half wave rectified current waveform to derive the DC output.

23. The DC to DC converter of claim 22 further comprising capacitive means connected to respond to the current at an output terminal of the rectifier means for providing a return path for the rectifier means.

24. The high voltage DC power supply of claim 23 wherein the capacitive means includes means for establishing a capacitive path for the half wave rectified current waveforms between the rectifier means output terminal and a low voltage terminal of the power supply source.

25. The high voltage DC power supply of claim 24 wherein the capacitive means includes means for establishing a capacitive path for the ramping current having the second polarity direction between the rectifier means output terminal and a first terminal of the choke so that the second polarity direction ramping current flows between a second terminal and the first terminal of the choke via the resonant circuit means, the rectifier means and the capacitive means.

26. The high voltage DC power supply of claim 23 wherein the capacitive means includes means for establishing a capacitive path for the ramping current having the second polarity direction between the rectifier means output terminal and a first terminal of the choke so that the second polarity ramping current flows between a second terminal and the first terminal of the choke via the resonant circuit means, the rectifier means and the capacitive means.

27. The DC to DC converter of claim 22 wherein the AC to DC converter and voltage multiplier means includes plural high speed signal switching diodes each having a recovery time that is a small fraction of the duration of each half wave rectified waveform.

28. In combination, a travelling wave tube having cathode, collector and helix electrodes, a high voltage DC power supply responsive to a relatively low voltage DC power source, a high frequency switching source for deriving pulses having variable durations, a switch controlled by the switching source to open and closed states, a flyback choke connected in series with the switch and the DC power source so current flows between terminals of the power source via the choke and switch while the switch is closed, resonant circuit means having a resonant frequency, the resonant circuit means being responsive to current flowing from the power source through the choke while the switch is closed for deriving a current having a half wave sinusoidal waveform each time the switch is closed, the choke being connected to the source, resonant circuit means and switch so that the amount of energy stored in the choke each time the switch is closed is determined by the duration of the pulses and the amplitude of each half wave sinusoidal waveform is determined by the amount of energy stored in the choke, the duration of each half wave sinusoidal waveform being determined by the resonant frequency, the resonant circuit means including means for converting the current having a half wave sinusoidal waveform to DC voltages supplied to the electrodes, and means responsive to the voltage between a pair of electrodes of said tube for controlling the durations of said pulses to maintain the voltage between the pair of electrodes substantially constant.

29. The combination of claim 28 wherein the resonant circuit means includes an inductor having a first terminal connected between the choke and switch and a second terminal connected to first electrodes of first and second capacitors connected in separate branch circuits, the first and second capacitors having second electrodes respectively connected to first and second AC to DC converter and voltage multiplier stacks included in said means for converting, each AC to DC converter an voltage multiplier in said stacks including a pair of oppositely poled unidirectional branches and a capacitor connected between oppositely poled electrodes of the pair of branches, the first and second stacks being stacked together, the cathode and helix being connected to the opposite polarity terminals of the first and second stacks, the collector being connected to a terminal between the first and second stacks.

30. The combination of claim 28 wherein the switching source includes means for deriving constant frequency variable duty cycle pulses.

31. A DC to DC converter responsive to a relatively low voltage DC power source comprising a high frequency switching source for deriving pulses having variable durations, rectifier means for deriving a DC output voltage, a switch controlled by the switching source to open and closed states, a flyback choke connected in series with the switch and the DC power source so current flows between terminals of the power source via the choke and switch while the switch is closed, resonant circuit means connected in circuit with the switch, the flyback choke and the rectifier means so that each time the switch is closed (a) a half wave rectified current waveform at the resonant frequency of the resonant circuit flows in the resonant circuit means and (b) a ramping current having a first polarity direction flows in the choke, and while the switch is closed a ramping current having a second polarity direction flows in the choke and the resonant circuit, the rectifier means responding to each half wave rectified current waveform to derive the DC output, and means responsive to the amplitude of the DC output for controlling the durations of the pulses to maintain the DC output at a substantially constant value, the amount of energy stored in the choke each time the switch being closed being determined by the durations of the pulses and the amplitude of each half wave rectified current waveform being determined by the amount of energy stored in the choke.

\* \* \* \* \*